United States Patent
McLean

[15] 3,697,781
[45] Oct. 10, 1972

[54] FREQUENCY TO VOLTAGE CONVERTER

[72] Inventor: Michael B. McLean, Franksville, Wis.

[73] Assignee: Johnson Service Company, Milwaukee, Wis.

[22] Filed: Nov. 12, 1970

[21] Appl. No.: 88,849

[52] U.S. Cl. ............... 307/235, 307/251, 307/246, 324/78 E, 328/151, 329/103, 332/1
[51] Int. Cl. .................................................. H03k 5/20
[58] Field of Search ............ 329/102, 103; 324/78 E; 328/151; 307/235, 238, 246; 332/1

[56] References Cited

UNITED STATES PATENTS

| | | | |
|---|---|---|---|
| 3,535,658 | 10/1970 | Webb | 328/151 X |
| 3,553,492 | 1/1971 | Bugay | 307/235 |
| 3,582,799 | 6/1971 | Reid | 307/246 X |
| 3,588,531 | 6/1971 | Bjor | 328/151 X |

Primary Examiner—Alfred L. Brody
Attorney—Andrus, Sceales, Starke & Sawall and Arnold J. Deangelis

[57] ABSTRACT

A sample-and-hold circuit samples an incoming alternating signal to provide a voltage proportional to input frequency of a sinusoidal signal. A Schmitt trigger circuit and a divide-by-two multivibrator convert the sinusoidal input signal into two square wave signals separated in phase by 180° and each corresponding to the previous full cycle of the input to provide sampling signals to a pair of sample-and-hold circuits. Each sample-and-hold circuit samples the opposite half cycle or period of a corresponding square wave. Transistor means are connected to the corresponding timing circuit to discharge a voltage storage means prior to sampling in response to the start of the sampling half period. Each sample-and-hold circuit includes a transistor selectively charging the voltage storage means from a constant voltage source during the sampling half period to produce a voltage level related to the input frequency which voltage level is held during the non-sampling half period. Analog switches are connected to the circuits and alternately connect each circuit to an output amplifier to apply the hold voltage during the non-sampling half period.

8 Claims, 5 Drawing Figures

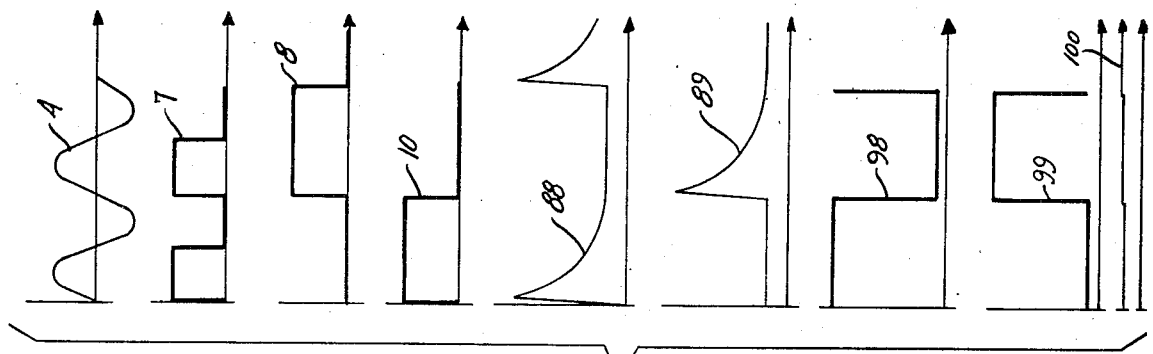
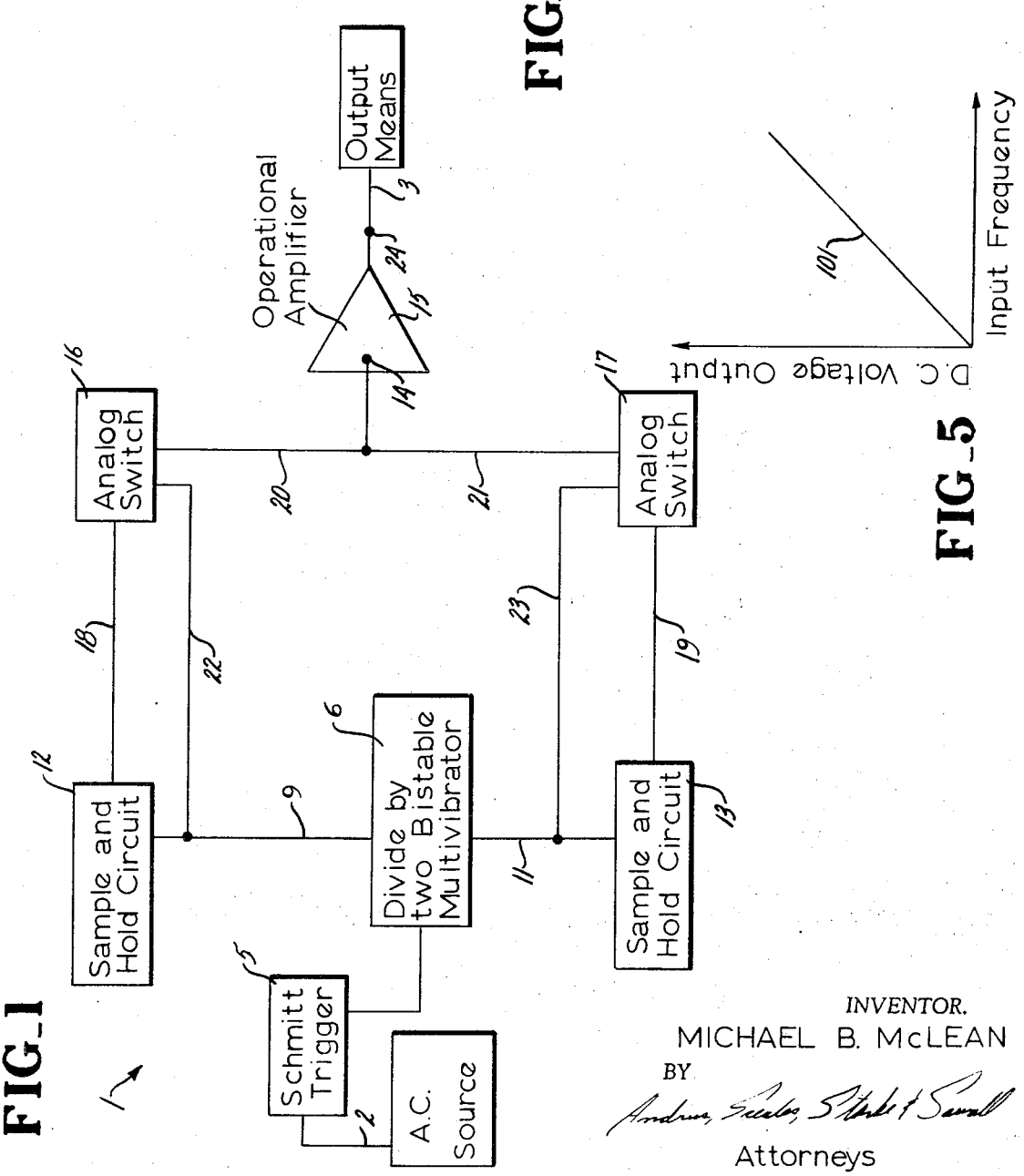

INVENTOR.
MICHAEL B. McLEAN

FREQUENCY TO VOLTAGE CONVERTER

BACKGROUND OF THE INVENTION

This invention relates to a frequency to voltage converter employing a novel sample and hold circuitry which is connected to selectively sample an alternating incoming signal and to supply a voltage linearly proportional to the incoming frequency.

In control circuits, a control voltage proportional to the frequency of an input signal may be required. Although conversion circuits have been employed, the response time of such circuits has been relatively long and the output changes have had an associated undesirable lag.

Capacitive charging and discharging systems have been generally employed in the past to convert the frequency signal into a related voltage signal. For example, the "diode pump" system employs a small capacitor which is connected to "pump" another larger capacitor through a diode configuration. Generally, in such capacitive systems, a step input frequency change requires five charging cycles to produce an output voltage proportional to the changed input frequency. Such circuits therefore do not provide a high degree of sensitivity due to the lengthy response time.

SUMMARY OF THE INVENTION

This invention generally relates to a frequency to voltage converter which establishes an analog output voltage having a magnitude linearly proportional to the frequency of an alternating input signal having symmetrical half periods and to novel sample and hold circuitry for establishing a voltage proportional to an incoming periodic signal.

In accordance with one aspect of the present invention, the frequency to voltage converter includes a sample and hold circuit which selectively samples each full period of the alternating signal and establishes a voltage proportional to frequency. The frequency proportional voltage is held during the non-sampling half period. Analog voltages that are linearly proportional to the frequency of the input signal are established by the sample-and-hold circuit every period or cycle of the incoming signal.

A first switching transistor as a switch means is connected to selectively connect a discharged voltage storage means to a negative voltage potential (ground) for the duration of one period of the input signal. The storage means is then charged toward the negative potential (ground) to a voltage level inversely proportional to one period of the input signal and hence directly proportional to the input frequency.

For a selected range of input frequencies, the RC time constant selected is such that the charged voltage level at the end of each cycle will be directly proportional to the input frequency.

For optimum operation, a square wave input signal having a pulse width corresponding to a one-half period is applied to bias the first transistor to conduct. Specifically, the first transistor is biased on to conduct by the leading edge of the input pulse and biased off by the trailing edge to permit conduction during a one-half period interval. As the frequency varies, the corresponding period of the square wave pulse also varies to vary therefore the length of conduction by the first transistor. Hence, the duration of conduction by the first transistor is inversely proportional to the frequency of the incoming signal.

In another aspect for optimum operation, a second and a third switching transistor are connected as switch means initially to remove the charge from the voltage storage means prior to charging by the first switching transistor. The second and third transistors are biased to conduct by the leading edge of the square wave input signal to shunt the storage means and remove all charge therefrom.

A timing circuit is connected to the second and third transistors to form a timing and switching means which biases the third transistor off after the charge has been removed from the voltage storage means. Thus, the deengergization of the third transistor by the timing and switching means effectively removes the shunt and allows the storage means to be charged through the first transistor. The timing circuit therefore permits the third transistor to conduct for only a short duration of the one-half square wave pulse period to allow for optimum charging of the storage means.

In another aspect of the invention, the input circuit receives a sinusoidal input signal or the like and establishes two square wave signals having a frequency one-half of the sinusoidal signal and separated in phase by 180°. A Schmitt trigger circuit may convert the sinusoidal input signal to a square wave signal having a corresponding phase and frequency. The square wave input is applied to a divide-by-two, bistable, multivibrator to produce the pair of square wave signals separated in phase by 180°.

The pair of sample-and-hold circuits are connected to receive the output of the divide-by-two, bistable, multivibrator, each receiving one square wave signal and sampling the one-half period pulse to produce a proportional analog voltage therefore to the frequency of the input signal sampled. Each sample-and-hold circuit holds the analog voltage during the non-sampling half period. A pair of analog switches selectively connects the storage means of each sample-and-hold circuit to the input of an amplifier during each non-sampling half period to establish a continuous voltage output directly proportional to the sinusoidal input frequency.

The pair of analog switches are also connected to the divide-by-two, bistable, multivibrator. The leading edge of each square wave signal biases the related analog switch off, while the trailing edge of the corresponding half period biases the switch on and thereby connects the corresponding sample-and-hold circuit to the amplifier. Since the pair of square wave pulses are separated by 180°, the pair of analog switches alternately connect each sample-and-hold circuit to the amplifying means.

It is, therefore, apparent that a simple and highly efficient direct frequency-to-voltage converter is provided which effectively responds to a frequency change by providing a step output voltage change for each cycle of input frequency.

BRIEF DESCRIPTION OF THE DRAWINGS

The drawings furnished herewith illustrate the best mode presently contemplated by the inventor and clearly disclose the above advantages and features, as well as others which will be readily understood from the detailed description thereof.

3,697,781

3

Figure 3:
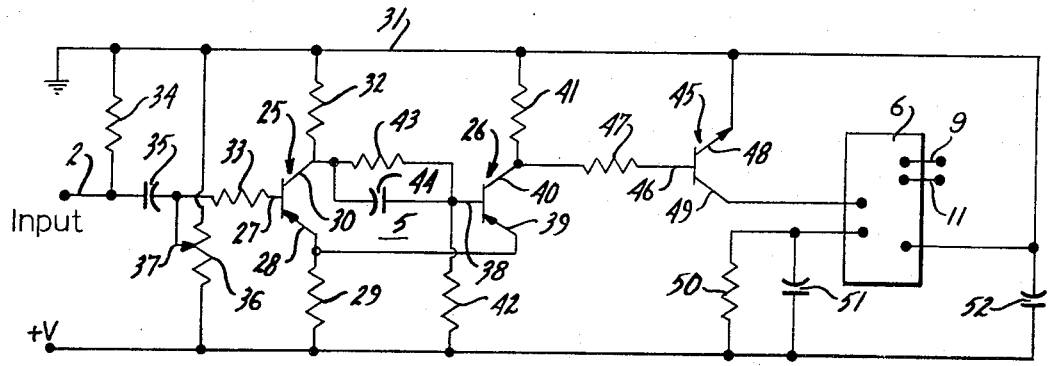
Figure 4:
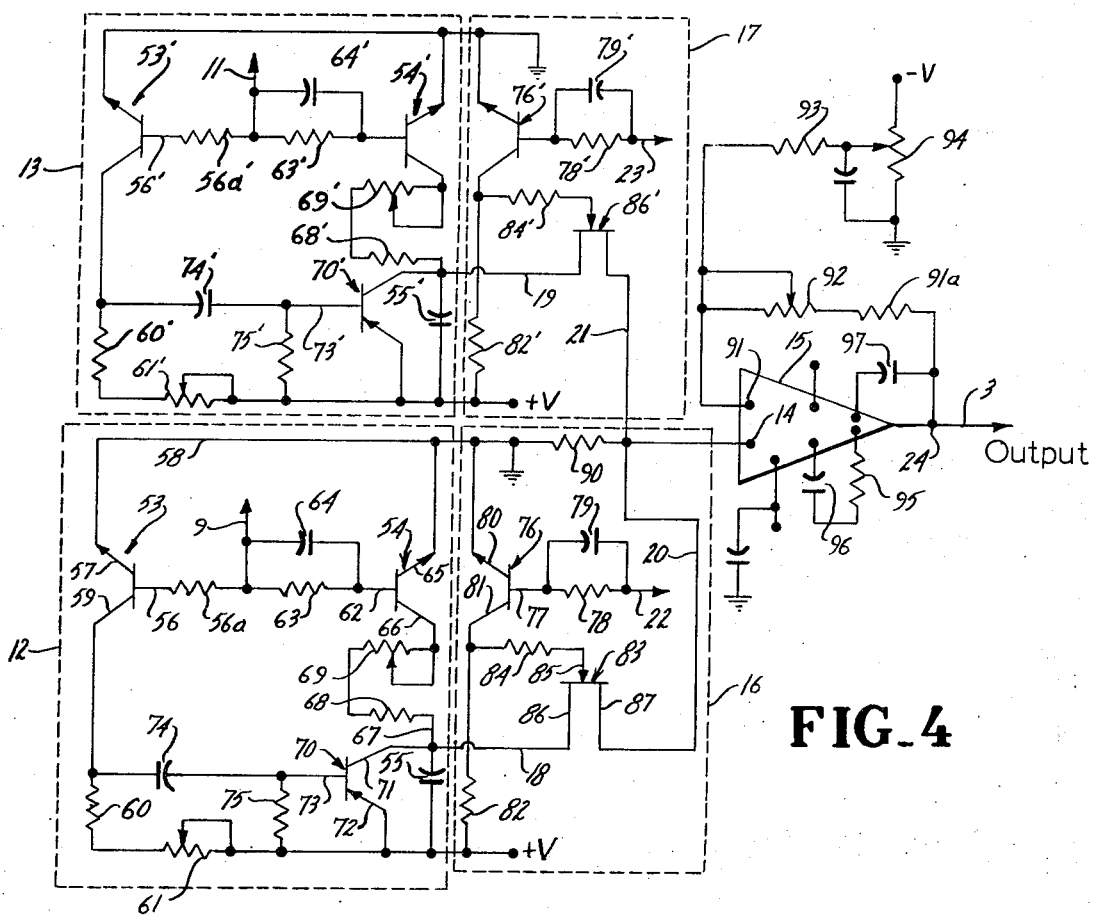

In the drawings:

FIG. 1 is a block diagrammatic view of a frequency-to-voltage converter;

FIG. 2 is a typical graphical illustration showing the voltage wave forms as a function of time as employed in the frequency-to-voltage converter of FIG. 1;

FIG. 3 is a schematic view of the Schmitt trigger connected to the divide-by-two, bistable, multivibrator of FIG. 1;

FIG. 4 is a schematic view of the pair of sample-and-hold circuits, the pair of analog switches, and the operational amplifier of FIG. 1; and FIG. 5 is a typical graphical illustration of the relationship between the input frequency and the output voltage.

DESCRIPTION OF THE PREFERRED ILLUSTRATED EMBODIMENT

Referring to the drawings and particularly FIG. 1, the illustrated embodiment of the invention includes a frequency to voltage converting circuit 1 connected to an input signal line 2 which is connected to a suitable alternating current source and to an output line 3 which is connected to a direct current output means. For example, a remotely located temperature, humidity or other condition sensing apparatus may produce an alternating current signal at line 2 having a frequency indicative of the condition. An incoming alternating signal 4 is graphically illustrated in FIG. 2 as a sinusoidal voltage versus time wave form.

Generally, circuit 1 includes a squaring network including a Schmitt trigger 5 connected to receive the alternating signal 4 and connected to correspondingly control a divide-by-two, bistable multivibrator 6. The Schmitt trigger 5 produces a periodic square wave signal 7, as shown in FIG. 2, in phase with the incoming signal 4 and having a periodic rate of incoming signal frequency.

The square wave signal 7 is supplied by a line to trigger the divide-by-two, bistable multivibrator 6 which generates a pair of square wave signals. More particularly, multivibrator 6 produces a first square wave signal 8 at a first terminal or line 9 and a second square wave signal 10 at a second terminal or line 11. The square wave signals 8 and 10, as shown in FIG. 2, each have a frequency equal to one-half that of the square wave signal 7 and are 180° out of phase with respect to each other. The signals at lines or terminals 9 and 11 are connected respectively to corresponding sample-and-hold circuits 12 and 13. Each sample-and-hold circuit, as hereinafter described, samples the respective square wave voltage for a corresponding one-half period to establish a voltage that is inversely proportional to the corresponding period and therefore directly proportional to the frequency of the sampled signal. The proportional voltage obtained during the sampling half period is held during the non-sampling half period, as will be more fully described.

The voltages sampled each half cycle by sample-and-hold circuits 12 and 13, are selectively transmitted to a common input 14 of an operational amplifier 15 by analog switches 16 and 17, respectively, during each respective non-sampling half period. The sample-and-hold circuits 12 and 13 are similarly connected to analog switches 16 and 17 by corresponding lines 18 and 19. In like manner, analog switches 16 and 17 are

4 connected to the common input 14 of operational amplifier 15 via lines 20 and 21, respectively. The output terminals or lines 9 and 11 of multivibrator 6 are also connected, respectively, to analog switches 16 and 17 via lines 22 and 23 to alternately connect the output of the circuits 12 and 13 to the common input of amplifier 15. A continuous output analog voltage therefore appears at an output terminal 24 of amplifier 15 which is linearly proportional to the input voltage signal and therefore the frequency of signal 4.

In operation, the leading edge of the positive going square wave signal 8 triggers the sample-and-hold circuit 12 to operate and simultaneously opens the analog switch 16 to operatively disconnect the circuit 12 from amplifier 15. The trailing edge of signal 8 closes the analog switch 16 to operatively connect the circuit 12 to operational amplifier 15.

Sample-and-hold circuit 13 and analog switch 17 perform in a similar manner to transmit a signal amplifier, but operate 180° out of phase with respect to sample-and-hold circuit 12 and analog switch 16. The operational amplifier 15 therefore alternately receives sampled voltages, each of which is proportional to the previous cycle of the frequency of the input signal to produce an analog output voltage linearly proportional to the input frequency of signal 4.

Referring to FIG. 3, a preferred circuit is shown for the elements shown in block diagram in FIG. 1. Particularly, Schmitt trigger 5 is a known circuit including a pair of similar transistors 25 and 26 of the PNP type connected in common emitter configuration to receive the input signal 4 on line 2. The transistor 25 has a signal input base 27 connected to line 2, an emitter 28 connected to a suitable positive bias voltage source, designated by the conventional "V+" in the drawing through a resistor 29, and a collector 30 connected to ground line 31 through collector resistor 32. The input base 27 is connected to line 2 by a coupling and bias network including a pair of resistors 33 and 34 to the opposite sides of a blocking capacitor 35 and connected between the base 27 and the ground line 31. Signal line 2 is connected to the junction of resistor 34 and capacitor 35. A variable resistor 36 is connected between positive bias voltage source "V+" and ground and includes a tap 37 connected to the juncture of capacitor 35 and resistor 33 to establish a selected voltage operating level and to bias transistor into saturation.

The transistor 26 has an input base 38 connected to the output of transistor 25, an emitter 39 connected to the bias voltage source through the common emitter resistor 29, and a collector 40 connected to ground line 31 through a collector resistor 41. The base input 38 is also connected to bias voltage source through a resistor 42 and is further connected through a parallel connected resistor 43 and capacitor 44 to the collector 30 of transistor 25.

In the initial condition of operation, transistor 25 is conducting in saturation while transistor 26 is cut off. A positive going signal, of a level determined by setting of tap 37, and applied to base 27, causes transistor 25 to cut off, and transistor 26 to rapidly turn on, supplying an output signal. A negative going signal applied to base 27 causes the transistors 25 and 26 to rapidly revert to their original operating condition. The Schmitt trigger 5 thus produces the square wave signal 7 in response to the sinusoidal signal 4, as shown in FIG. 2.

An NPN type transistor 45 is connected as an impedance matching circuit to the output of transistor 26. Specifically, transistor 45 has a base 46 connected to collector 40 through a resistor 47, an emitter 48 connected to ground line 31, and a collector 49 connected to supply the output signal 4 to multivibrator 6. The output signal 7 is a square wave having the same phase and frequency as input signal 4 with each pulse having a rapidly rising slope to provide efficient operation of multivibrator 6.

The divide-by-two, bistable multivibrator 6 is shown in block diagrammatic form in FIG. 3 and is comprised of any complementary bistable circuit capable of driving two loads in perfect symmetry with positive and negative outputs, such as provided in a standard SN7000 series integrated circuit manufactured by Texas Instruments. A resistor 50 and a pair of capacitors 51 and 52 connect multivibrator 6 to a positive voltage source. As previously described, the output signals 8 and 10 are provided by the divide-by-two bistable multivibrator 6 and each is a square wave pulse, with the signals separated in phase by 180° and each of a frequency equal to one-half of the frequency of signal 4.

Referring to FIG. 4, similar novel sample-and-hold circuits 12 and 13 are shown connected to the operational amplifier 15 by the analog switches 16 and 17. The sample-and-hold circuit 12, together with the related analog switch 16, are described in detail. The elements of sample-and-hold circuit 13, together with the related analog switch 17, are substantially the same and are identified by corresponding primed numbers for simplicity of explanation.

The illustrated sample-and-hold circuit 12 of this invention includes a pair of NPN type transistors 53 and 54 connected in common to terminal or line 9 to control the charging and discharging of a capacitor 55.

The transistor 53 controls a timing circuit to rapidly discharge capacitor 55 and has a base 56 connected to terminal 9 through a resistor 56a, an emitter 57 connected to a ground line 58, and a collector 59 connected to a bias voltage source through a resistor 60 in series with a variable resistor 61.

The transistor 54 controls a charging circuit and has a base 62 also connected to terminal 9 through a parallel connected resistor 63 and capacitor 64, an emitter 65 connected to ground line 58, and a collector 66 connected to a bias voltage source through a series branch 67 including the storage capacitor 55, a resistor 68 and a variable resistor 69.

The timing circuit of transistor 53 includes a transistor 70 connected as a rapidly acting switch across storage capacitor 55. Transistor 70 is shown as a PNP type having a collector 71 connected to the juncture of the resistor 68 and the capacitor 55, an emitter 72 connected to the bias voltage line in common with capacitor 55. The transistor includes a base 73 connected by a capacitor 74 to collector 59 of transistor 53 and directly to the bias voltage source through a resistor 75. The capacitor 74 is also paralleled with the resistor 60 and variable resistor 61 in series with resistor 75.

In operation, the leading positive edge of signal 8 from multivibrator 6 simultaneously turns on transistors 53 and 54. Transistor 53 turns on transistor 70 and discharges capacitor 55 rapidly. A conducting path also exists through transistor 54 as traced from voltage source "V+", transistor 70 and capacitor 55 in parallel, resistors 68 and 69, transistor 54, and to ground line 58. As long as transistor 70 is turned on, the capacitor 55 is by-passed and allowed to discharge as described. Transistor 70 is controlled by charging of capacitor 74 from voltage source "V+" through resistor 75 and transistor 53. The timing constant of resistor 75 and capacitor 74 is selected to be relatively short and of the order of 0.2 percent of the maximum period of the square wave to provide a shunt to capacitor 55 to permit complete discharge thereof and to then turn transistor 70 off, as determined by the time constant provided by capacitor 74 and resistor 75.

The transistor 70 conducts for only a minute duration at the beginning of the sampling half period to dissipate any residue charge remaining on the capacitor 55. When transistor 70 turns off, capacitor 55 is connected in series with the conducting transistor 54 and the positive voltage source for the following duration of the sampling half period, charging toward ground potential until the trailing edge of signal 8 goes sufficiently negative to turn transistors 53 and 54 off. With transistor 54 biased off, capacitor 55 retains a voltage proportional to the sampling half period. With transistor 53 biased off, capacitor 74 discharges through the parallel resistors 60, 61 and 75 to provide a similar sampling response to the next leading edge of signal 8 of multivibrator 6.

The sampled voltage is held by sample-and-hold circuit 12 during the non-sampling half periods and transmitted to operational amplifier 15 by analog switches 16 at the initiation of the next sampling half period.

The voltage ($v$) stored in capacitor of a capacitance (C) when charged by a constant voltage (V) through a resistor of a resistance (R) for a time ($t$), is defined by the following known equation, exponentially charging the storage means from the source means:

$$v = V(1 - e^{-t/RC})$$

In the illustrated circuit, the bias voltage is a constant source and the resistance R is the resistance of series connected resistors 68 and 69, and capacitance C is the capacitance of capacitor 55. The maximum and minimum input frequencies desired to be received by the system are determined and then the values of resistors 68 and 69 and of capacitor 55 are selected to provide a linear relationship between the voltage during the sampling half period and the inverse of the period which is equivalent to the frequency. Thus, the time constant and the frequency are selected such that the voltage is on the linear portion of the charging curve.

To provide for effective sampling, the time constant of resistor 75 and capacitor 74 is selected to be much smaller than the time constant of capacitor 55 and the related charging resistors 68 and 69, and preferably the time constants differ by a factor of the order $10^2$. Thus, the discharging of capacitor 55 provided by transistor 70 occurs only for a relatively short duration of the sampling half cycle to allow for adequate sampling and linear frequency to voltage conversion.

The variable resistors 61 and 69 have been particularly added to sample-and-hold circuit 12 to provide a balanced operation between sample-and-hold circuit 12 and sample-and-hold circuit 13, thereby compensating for normal tolerances in component selection.

Referring to FIG. 4, analog switch 16 is shown including an NPN type transistor 76 having a base connected by a parallel connected resistor 78 and capacitor 79 to terminal 9 to receive the square wave signal 8 simultaneously with the input to the circuit 12. Transistor 76 includes an emitter 80 connected to ground line 58, and a collector 81 connected by a resistor 82 to the bias supply. A field effect transistor 83 is of the enhancement mode variety commonly used in chopper or switching operations and has a gate 85 connected by resistor 84 to collector 81, a source 86 connected to the juncture of capacitor 55 and resistor 68, and a drain 87 connected to line 20 as an input to operational amplifier 15.

In operation, the leading edge of signal 8 applied to base 77 of transistor 76 will substantially prevent conduction. The non-conducting transistor 76 will bias field effect transistor 83 off to effectively provide an open circuit between sample-and-hold circuit 12 and operational amplifier 15 during the sampling half cycle. The open circuit provided by analog switch 16 therefore allows predetermined charging toward ground of capacitor 55 during the sampling half period.

The trailing edge of signal 8 biases transistor 76 on, which, in turn, drives gate 85 to a reduced voltage to turn field effect transistor 83 on. Analog switch 16 effectively connects capacitor 55 at its then charged level to operational amplifier 15 during the non-sampling half period. The leading edge of the next following pulse of signal 8 will turn analog switch 16 off to again permit sample-and-hold circuit 12 to again charge capacitor 55.

As previously mentioned, sample-and-hold circuit 13 with analog switch 17 operates in identical manner with the exception that the sequence occurs at opposite half periods as dictated by the 180° phase relationship between signals 8 and 10.

With reference to FIG. 2, analog switch 16 therefore selectively connects a voltage signal 88 at such charged level to operational amplifier 15 during a one-half period while analog switch 17 connects voltage signal 89 to operational amplifier 15 during the following half period. Specifically, operational amplifier 15 alternately receives voltage signals 88 and 89 which are each inversely proportional to a preceding period and hence directly proportional to the frequency of input signal 4.

The operational amplifier 15 is shown illustrated in diagrammatic block form in FIG. 4 and is generally any suitable high gain, general purpose operational amplifier, such as those commonly employed in the art. Generally, operational amplifier 15 is selected to feature a low offset, a high input impedance, and a large output swing under load such as found in the 709 series integrated operational amplifier. The high input impedance prevents effective time holding charges of capacitor 55. The illustrated operational amplifier 15 has the common non-inverting input 14 connected to analog switch 16 through the lead 20, to analog switch 17 through the lead 21, and to ground line 58 through a high impedance resistor 90.

The output terminal 24 of operational amplifier 15 is connected in feedback circuitry to an inverting input terminal 91 through a resistor 91a and a variable resistor 92. The inverting input 91 is further connected to a bias negative voltage source through a resistor 93 and a variable resistor 94. Resistance of resistor 92 is varied to establish the desired gain for operational amplifier 15 while the resistance of resistor 94 is varied to establish a differential null or zero. For normal operation, a resistor 95 and a pair of capacitors 96 and 97 are provided in feedback loops to the internal stages of operational amplifier 15 to provide compensation and maintain stability.

In operation, the operational amplifier 15 is alternately connected to voltage signals 88 and 89 of circuits 12 and 13, as applied to input 14. Specifically, application of voltage signal 88 to operational amplifier 15 will produce an output signal corresponding to signal 98, while application of signal 89 will produce an output signal corresponding to signal 99. The signals 98 and 99 are essentially square wave signals having a pulse width corresponding to a half period. Thus, each pulse will alternately appear at output terminal 24 to produce a continuous analog voltage output which is linearly proportional to the input frequency, as graphically illustrated by signal 100 in FIG. 2.

The linearity between the input frequency of signal 4 and the output voltage of signal 100 for each cycle of sampling is graphically illustrated by line 101 in FIG. 5.

The illustrated frequency to voltage converter has been found to be particularly effective in linearly converting a 2,000 to 3,000 cycle input to a zero to 10 volt output. It is therefore evident that the present invention provides a highly satisfactory and reliable direct frequency to voltage converter which eliminates the need for filtering networks and which linearly responds to frequency change for each cycle of input.

Various modes of carrying out the invention are contemplated as being within the scope of the following claims particularly pointing out and distinctly claiming the subject matter which is regarded as the invention.

I claim:

1. A signal sampling circuit for sampling a variable periodic voltage signal of a known minimum and maximum frequency, comprising
   a constant voltage source means,
   capacitive storage means,
   switch means connected to said source means and to said storage means and selectively establishing a discharging circuit to set the storage means to a common reference charging potential and a charging circuit exponentially charging said storage means from said constant voltage source means, and
   timing and switching means connected to receive said periodic signal being sampled and connected to actuate said switch means to simultaneously establish said charging and discharging circuits in response to the start of a charging period and having means to rapidly open said discharging circuit after a selected short time period and thereby exponentially charging said storage means from said constant voltage source for a predetermined portion of the period of said periodic signal, said charging circuit including resistive means conjointly selected with said capacitive storage means and said known frequency signal to establish a voltage output directly proportional to said frequency signal and with a linear frequency to voltage output.

2. The circuit of claim 1, wherein said voltage signal is essentially a square wave signal, said timing and switching means being responsive to the level of the square wave signal.

3. The circuit of claim 1, wherein said switch means includes a first switch means connected in said charging circuit and a second switch means connected in said discharging circuit, said second switch means being connected across said capacitive storage means to selectively remove all voltage from said capacitive storage means prior to charging.

4. The circuit of claim 3, wherein said signal is an alternating current signal, input means connected to receive said signal and generating a square wave having a pulse width of one-half period, said first and second switch means being responsive to the level of said signal with the leading edge energizing said switch means and establishing sampling sequence and the trailing edge of said square wave de-energizing said first and second switch means to end said sampling sequence.

5. The circuit of claim 3, wherein said timing and switching means includes a third switch means connected to selectively energize said second switch means and including a capacitive timing means responsive to conduction of said third switch means to terminate conduction of said second switch means and permit said voltage storage means to be charged through said first switch means.

6. The signal sampling circuit of claim 5, wherein
said first switch means includes a first transistor connected in a common emitter circuit including a collector circuit including said capacitive storage means, an emitter circuit connected to ground, and a base circuit connected to receive said signal,
said second switch means includes a second switching transistor having a base circuit including said capacitive timing means, a collector circuit connected to one side of said capacitive storage means, and an emitter circuit connected to the opposite side of said capacitive storage means,
said third switch means includes a third switching transistor having a base circuit connected in common with the base circuit of said first switching transistor to receive said signal, an emitter circuit connected to ground, and a collector circuit connected to said base circuit of said second switching transistor, said alternating signal selectively biasing said first and third transistors on and off according to the signal level at said base circuits, and
said second transistor being biased to conduct by the conduction of said third transistor to shunt said storage capacitor to remove all stored charge, said capacitive timing means interrupting the conduction of said second transistor and thereby charging said capacitive storage means through said first switching transistor.

7. The circuit of claim 6, wherein said first and second transistors are biased to conduct by said generated square wave during a sampling half period each cycle and said third transistor is biased to conduct for a relatively short interval at the beginning of each sampling half period.

8. The circuit of claim 6, wherein said capacitive timing means includes a resistor connected to said voltage source and said base circuit of said second transistor and a timing capacitor connected in series between the collector circuit of said third transistor and the base circuit of said second transistor, said timing capacitor being charged and biasing said second transistor off after removing all charge from said storage capacitor, and a resistor means connected in parallel with said resistor and said timing capacitor to discharge said capacitor in response to turn off of said third transistor.

* * * * *